US011216957B2

(12) United States Patent
Madsen

(10) Patent No.: US 11,216,957 B2
(45) Date of Patent: Jan. 4, 2022

(54) METHOD AND APPARATUS FOR DETECTING MOTION DEVIATION IN A VIDEO

(71) Applicant: CANON KABUSHIKI KAISHA, Tokyo (JP)

(72) Inventor: John Madsen, Regstrup (DK)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 16/209,721

(22) Filed: Dec. 4, 2018

(65) Prior Publication Data

US 2019/0188869 A1 Jun. 20, 2019

(30) Foreign Application Priority Data

Dec. 19, 2017 (GB) ..................................... 1721334

(51) Int. Cl.
*G06T 7/246* (2017.01)
*G08B 13/196* (2006.01)
*G06K 9/00* (2006.01)
*G06T 7/20* (2017.01)

(52) U.S. Cl.
CPC .......... *G06T 7/251* (2017.01); *G06K 9/00718* (2013.01); *G06K 9/00771* (2013.01); *G06T 7/20* (2013.01); *G08B 13/1961* (2013.01); *G06K 2009/00738* (2013.01); *G06T 2207/20021* (2013.01); *G08B 13/19613* (2013.01)

(58) Field of Classification Search
CPC ................ G06T 7/251; G06K 9/00718; G06K 9/00771; G06K 2009/00738; G08B 13/1901; G08B 13/19613
See application file for complete search history.

(56) References Cited

U.S. PATENT DOCUMENTS

| 7,133,537 | B1 | 11/2006 | Reid |
| 7,236,527 | B2 | 6/2007 | Ohira |
| 8,320,458 | B2 | 11/2012 | Sato |
| 8,508,599 | B2 | 8/2013 | Miyasako |
| 9,641,838 | B2 | 5/2017 | Takeda |
| 10,425,582 | B2 | 9/2019 | Kopf |

(Continued)

FOREIGN PATENT DOCUMENTS

| CN | 104137146 B | * | 3/2017 | ............. H04N 19/23 |
| EP | 1631073 A2 | | 3/2006 | |

(Continued)

OTHER PUBLICATIONS

Combined Search and Examination Report under Sections 17 and 18(3) for Application No. GB 1721334.9, dated Jun. 19, 2018.

*Primary Examiner* — Zhitong Chen
(74) *Attorney, Agent, or Firm* — Canon U.S.A., Inc. IP Division

(57) ABSTRACT

A current motion grid comprising a plurality of elements is generated by storing in each element of the current motion grid an indication of whether there is a change between corresponding elements of at least two images captured from the video. A motion model comprising a plurality of elements is provided by accumulating information from motion grids obtained from the video. At least one element of the current motion grid is compared to at least one corresponding element of the motion model. It is determined whether there is motion deviation in accordance with the result of the comparison.

23 Claims, 14 Drawing Sheets

(56) References Cited

U.S. PATENT DOCUMENTS

| | | | |
|---|---|---|---|
| 2003/0219146 A1* | 11/2003 | Jepson | G06T 7/251 382/103 |
| 2006/0045185 A1* | 3/2006 | Kiryati | G08B 13/19608 375/240.16 |
| 2008/0201116 A1 | 8/2008 | Ozdemir et al. | |
| 2011/0205359 A1 | 8/2011 | Lee et al. | |
| 2012/0170802 A1 | 7/2012 | Millar et al. | |
| 2012/0229630 A1 | 9/2012 | Huang | |
| 2014/0072180 A1 | 3/2014 | Yamaguchi | |
| 2014/0254933 A1 | 9/2014 | Jin et al. | |
| 2015/0222919 A1* | 8/2015 | Licata | G08B 13/1961 375/240.16 |
| 2015/0281715 A1 | 10/2015 | Lawrence et al. | |
| 2016/0005281 A1* | 1/2016 | Laska | H04N 7/188 348/143 |
| 2018/0227538 A1 | 8/2018 | Wang et al. | |

FOREIGN PATENT DOCUMENTS

| | | |
|---|---|---|
| GB | 2283385 A | 5/1995 |
| WO | 2000/073996 A1 | 12/2000 |

\* cited by examiner

140

| | | | | | | | |
|---|---|---|---|---|---|---|---|
| 1 | 1 | 0 | 0 | 0 | 0 | 0 | 0 |
| 1 | 0 | 0 | 0 | 0 | 0 | 0 | 0 |
| 0 | 0 | 0 | 1 | 1 | 1 | 0 | 0 |
| 0 | 0 | 0 | 1 | 1 | 1 | 0 | 0 |
| 0 | 0 | 0 | 0 | 0 | 0 | 0 | 0 |
| 0 | 1 | 0 | 0 | 1 | 1 | 0 | 0 |
| 1 | 0 | 1 | 0 | 1 | 1 | 1 | 0 |
| 0 | 0 | 0 | 0 | 0 | 1 | 1 | 0 |

141 — top-left region; 142 — right region

FIG. 1B

METHOD AND APPARATUS FOR DETECTING MOTION DEVIATION IN A VIDEO

CROSS-REFERENCE TO RELATED APPLICATION

The present patent application claims the benefit under 35 U.S.C. § 119(a)-(d) of United Kingdom Patent Application No. GB1721334.9, filed on Dec. 19, 2017 and entitled "METHOD AND APPARATUS FOR DETECTING MOTION DEVIATION IN A VIDEO". The content of GB1721334.9 is incorporated herein by reference in its entirety.

TECHNICAL FIELD

The present invention relates to detecting motion deviation in a video. More particularly, and without limitation, the present invention relates to a method, an apparatus, a computer program and computer-readable storage medium for detecting motion deviation in a scene of a surveillance video using a grid based motion model.

BACKGROUND

In video surveillance and monitoring technologies, motion detection is commonly used for determining when to record a video. The motion of an object is typically detected by motion detecting sensors such as passive infrared (PIR) sensors, sensors which use microwave or ultrasonic pulses, or vibration sensors. In imaging technology, algorithms are known for detecting motion in a continuous video stream. Some algorithms are based on comparing the current video frame to one from the previous frames. Some motion detection methods utilize image processing filters to find regions in which two video frames differ from each other.

However, most of the conventional image processing algorithms are computationally heavy and thus not applicable to big video surveillance setups because the hardware costs would be too high. Also, with the above conventional methods, it is not possible to distinguish between normal and abnormal motion.

Thus, there is a need for detecting motion deviation in a video, which provides optimized usage of computing and hardware resources.

SUMMARY OF THE INVENTION

The present invention provides a method, an apparatus, a computer program and a computer-readable storage medium for detecting motion deviation in a video using a grid based motion model.

According to a first aspect of the invention, there is provided a method for detecting motion deviation in a video.

According to a second aspect of the invention, there is provided an apparatus for detecting motion deviation in a video.

According to a third aspect of the invention, there is provided a computer-readable storage medium storing a computer program for performing a method for detecting motion deviation in a video.

Grid data has a very small size so that it requires much less storage space compared to video data. The motion grid data can be stored as metadata separately in a database or together with the video data without requiring any significant extra disk space. Hence, the present invention optimizes the usage of computing and memory resources and thus reduces hardware costs.

An additional advantage is that traffic load due to transfer of motion grid data, for example when retrieving recordings from remote recording servers, will remain small. Due to the small amount of data to be transferred, it does not occupy or require high network capacity. This is especially preferable since the available bandwidth between surveillance cameras and servers processing the data may often be limited and its use may be prioritised for other purposes during business hours.

The motion model may be generated from a live video sequence or a previously recorded video sequence. This is advantageous for example when there is not enough network capacity to transfer complete video recordings in a timely fashion. The deviation detection can be performed using the previously stored metadata, thus allowing for very fast forensic deviation detection. All computing operations may be performed on motion grid data alone so they are computationally light weight.

Furthermore, the present invention allows extracting and comparing motion patterns using only motion grid metadata. Thus, the amount of data to be analysed remains low in comparison to using conventional image processing algorithms. This reduces the required computing resources in systems implementing the invention.

Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

Embodiments will now be described, by way of example only, with reference to the accompanying drawings, in which:

FIG. 1B is a diagram illustrating a motion grid;

DETAILED DESCRIPTION

Various illustrative embodiments, features, and aspects of the invention will be described in detail below with reference to the drawings. Configurations according to the illustrative embodiments of the present invention, which will be described below, are merely examples, and the present invention is not limited to these configurations.

Figure 1A:
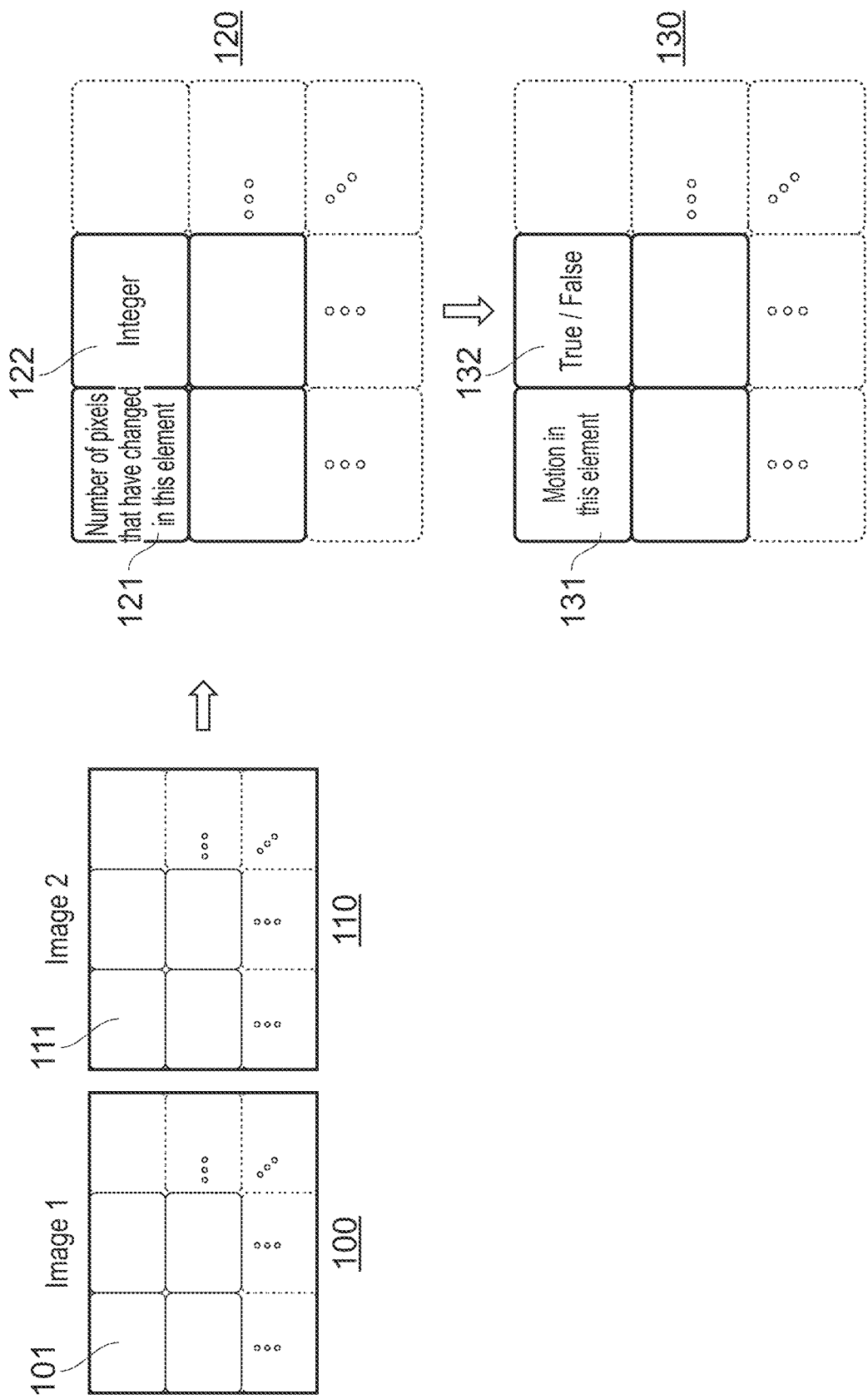
FIG. 1A is a diagram illustrating a method of generating a motion grid.

FIG. 1A illustrates a method of generating a motion grid according to some embodiments of the present invention. In FIG. 1A, at least two images or video frames, Image 1 (100) and Image 2 (110), are captured from a video sequence (not shown). The video sequence may be a live video sequence so that motion grids 120, 130 may be generated in real time. The video sequence may also have been recorded in advance and stored in a memory. The video sequence may comprise a certain, selected video scene of a surveillance video recorded by a surveillance camera.

Next, each of the at least two captured images 100, 110 is divided into a grid of a plurality of elements 101, 111 so that for each element of the grid of Image 1, there is a corresponding element on the grid of Image 2, having the same location and size. Each element of the grid includes a plurality of pixels. For example, the grid may be made up of 4×4 pixel squares.

Throughout this description, the term 'corresponding elements' refers to elements having the same location and size on different grids. The location may be defined for example by a row and a column on the grid.

Since the at least two images 100, 110 are captured at different temporal locations of the video, the image may be the same or it may have changed, if there is an object moving in the video which is captured into the image. The change can be detected by comparing the corresponding elements 101, 111 in the two images 100, 110, respectively, with each other. The change may be measured for example by counting the number of changed pixels in the corresponding elements. However, also other measurement methods may be used.

In the following, it is described how the motion grid 120, 130 is generated. First, it is determined how many pixels have changed (121) between the two captured images 100, 110 in each grid element. This information may be stored for example as an integer 122 in each element of the motion grid. The change between the two images may also be measured by other means.

Next, it is determined, based on the determined number of changed pixels in an element, whether there is a change in the element. A change would be an indication that there is motion in the video in that element. The determination may take into account a threshold value so that not all changes in the video are registered as motion. For example, it may be assumed that there is a certain amount of noise present in the image, which may be taken into account by means of a noise threshold.

If it is determined that there is a change between the corresponding elements of the two captured images 100, 110, that information is stored as an indication 131 in the corresponding element of the motion grid. The indication may be for example a 'true' (1) indication 132 if there is a change, or a 'false' (0) indication 132 if no change is detected. Again, a threshold may be taken into account so that the indication is marked as 'true' only if the level of the change (e.g., the number of changed pixels) exceeds a predetermined threshold. The initial value of the indication in each element of the motion grid 120, 130 may be 'false' (0). Thus, the motion grid 130 is generated by binarization of the motion grid 120 using a threshold value.

When generating the motion grid 120, 130, the whole frame of the captured images 100, 110 may be taken into account, or only a part of the frame of the images 100, 110 and the grids thereof may be considered based on for example an area of interest in the image.

The size of the motion grid 120, 130 corresponds to the size of the grid of the captured images 100, 110, or alternatively, to the size of the selected region in the captured images. The motion grids shown in FIG. 1A consist of a plurality of rectangle-formed elements, however also another form, such as a square form, may be used.

FIG. 1B shows an example of a motion grid. The motion grid 140 is an x by y grid (e.g. 8 by 8 as shown in FIG. 1B, but not limited thereto). Other possible sizes are for example 200 by 100 or 50 by 25. The motion grid 140 includes in each element a 'true' ('1') or 'false' ('0') indication of whether the element or at least one pixel has changed, optionally with some noise threshold, between two given image captures. In element 142, no change has been detected, as can be seen from the indication '0'.

The elements on the motion grid 140 in which a change has been marked or indicated and which are connected as neighbours may form a segment 141. On the motion grid, two elements are neighbours if they are adjacent to each other either horizontally, vertically or diagonally. Hence, on the motion grid 140, there are four segments consisting of elements with a 'true' (1) indication.

Figure 2A:
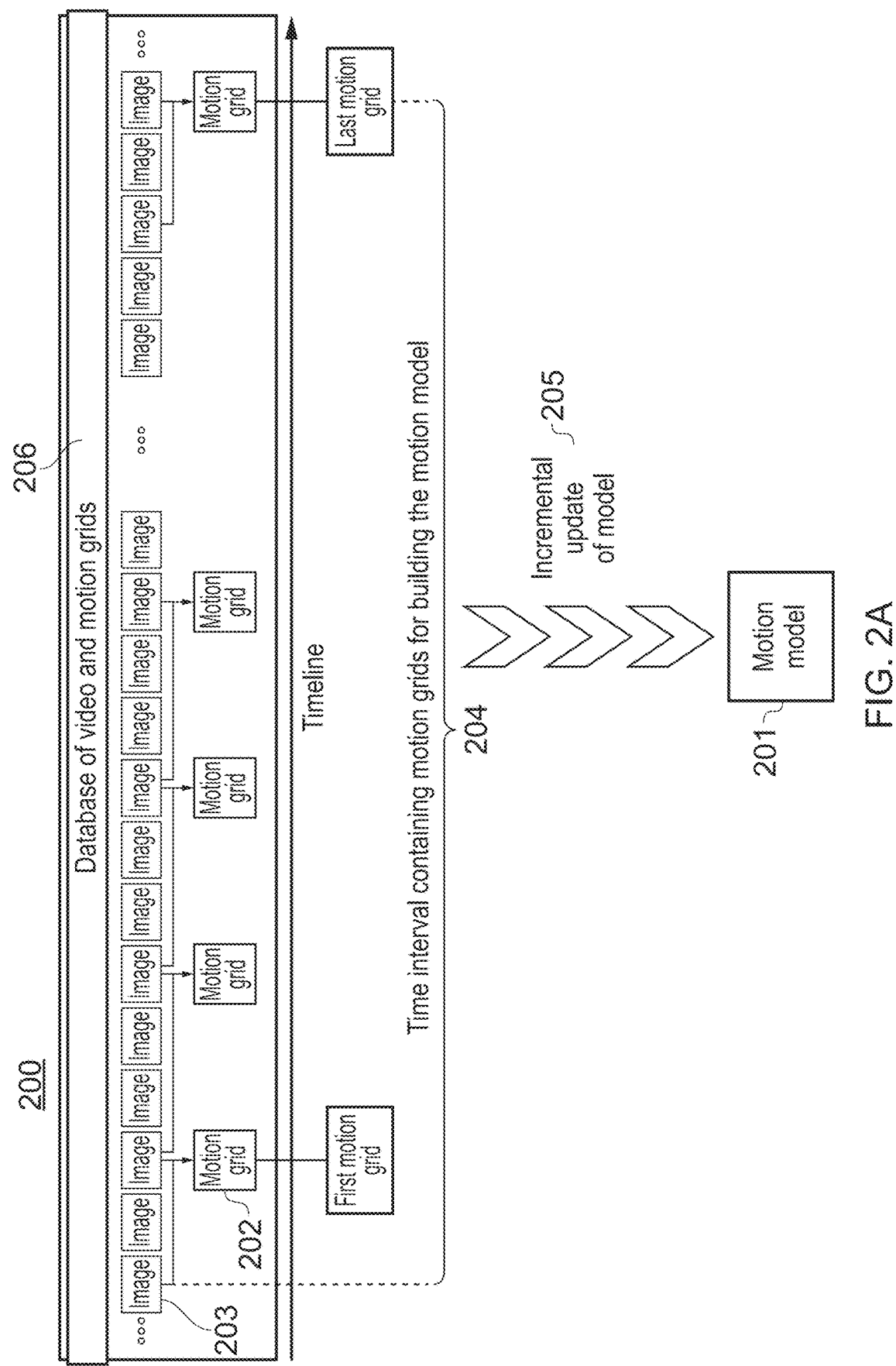
FIG. 2A is a diagram illustrating a method of generating a motion model.

FIG. 2A is an illustration of a method 200 for generating a motion model or a deviation model 201 according to some embodiments of the present invention. A series of motion grids 202 is obtained based on captured images 203 as described above. For example, a first captured image from a video sequence is compared to a second captured image from the same video sequence. For example, every third captured image can be used for building the motion model, as shown in FIG. 2A. However, the sampling frequency of the video sequence is not limited by the present invention. The duration between the first and the last sampled image in the video sequence defines a time interval 204 from which the series of motion grids 202 is obtained. Hence, the series of motion grids 202 comprises a number of motion grids which are used to build the motion model 201.

The time interval 204 may be selected so that it covers a selected scene in the video, which is of special interest. It can be for example a certain time of a day, such as from 4 pm until 6 pm, or generally daytime, or night time. The motion model 201 may represent motion behaviour during the time interval and may be used for example to model traffic situations during a rush hour. Deviations from the motion model would then represent abnormal (unexpected, unusual) motion. The time interval can also be related to a day of the week in order to have a model of normal motion behaviour on a specific day. It can be also a combination of the above, such as Friday, from 4 pm until 6 pm. Selecting a time frame aims at creating a model that represents normal motion expected in the monitored area of interest during the selected time.

The selected scene in the video may include video sequence for a specific place such as a house or property, a storage space, an outdoor area, a street or highway or an urban area to be monitored.

The motion model 201 contains a grid having the same dimensions as those of the motion grids 202. The information in the elements of the motion grids 202 is incrementally accumulated. It means that in each element of the motion model 201, an indication will be stored of whether a change has been detected in any of the corresponding elements of the series of motion grids 202 that are used to generate the motion model. The motion model 201 may be stored in a memory or a database.

The motion model 201 may be updated over time by adding further motion grids from the video sequence to the series of motion grids 202. The motion model 201 may also be updated by removing motion grids from the series of motion grids 202.

The series of motion grids 202 may be obtained from a live video sequence. It may also be obtained from motion grid data which has been generated in advance and stored for example in a database 206. Processing of the motion grid data is light weight because it does not require processing of raw video data. There is also no need to process the data on-site where it has been recorded but it can be transferred to a management site server where the processing takes place.

Figure 2B:
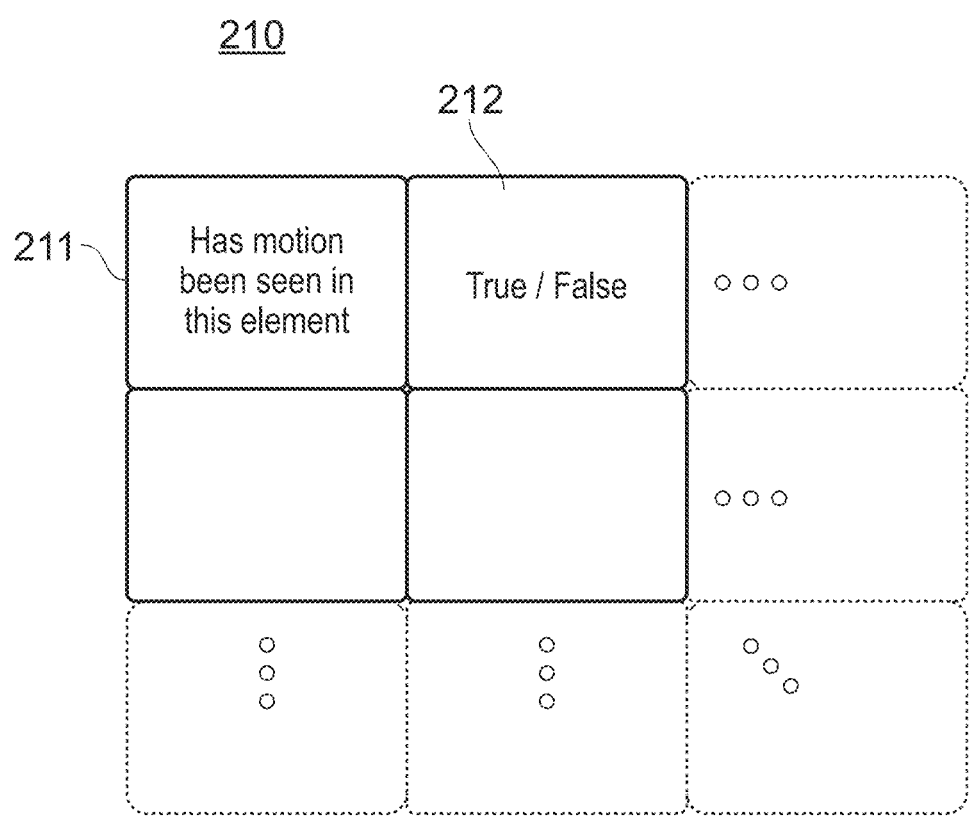
FIG. 2B is a diagram illustrating a motion model.

FIG. 2B shows a motion model 210 according to the present invention. The motion model 210 has a grid format similar to the motion grid of FIG. 1A. As described above, each element of the motion model 210 contains an indication, e.g. a 'true' or 'false' indication 212 of whether a change has been detected in any of the corresponding elements of the series of motion grids (211). Based on the model it is possible to see in which elements motion has occurred in the past in a certain scene of the video. Thus, the motion model represents expected motion behaviour in the scene.

Figure 3:
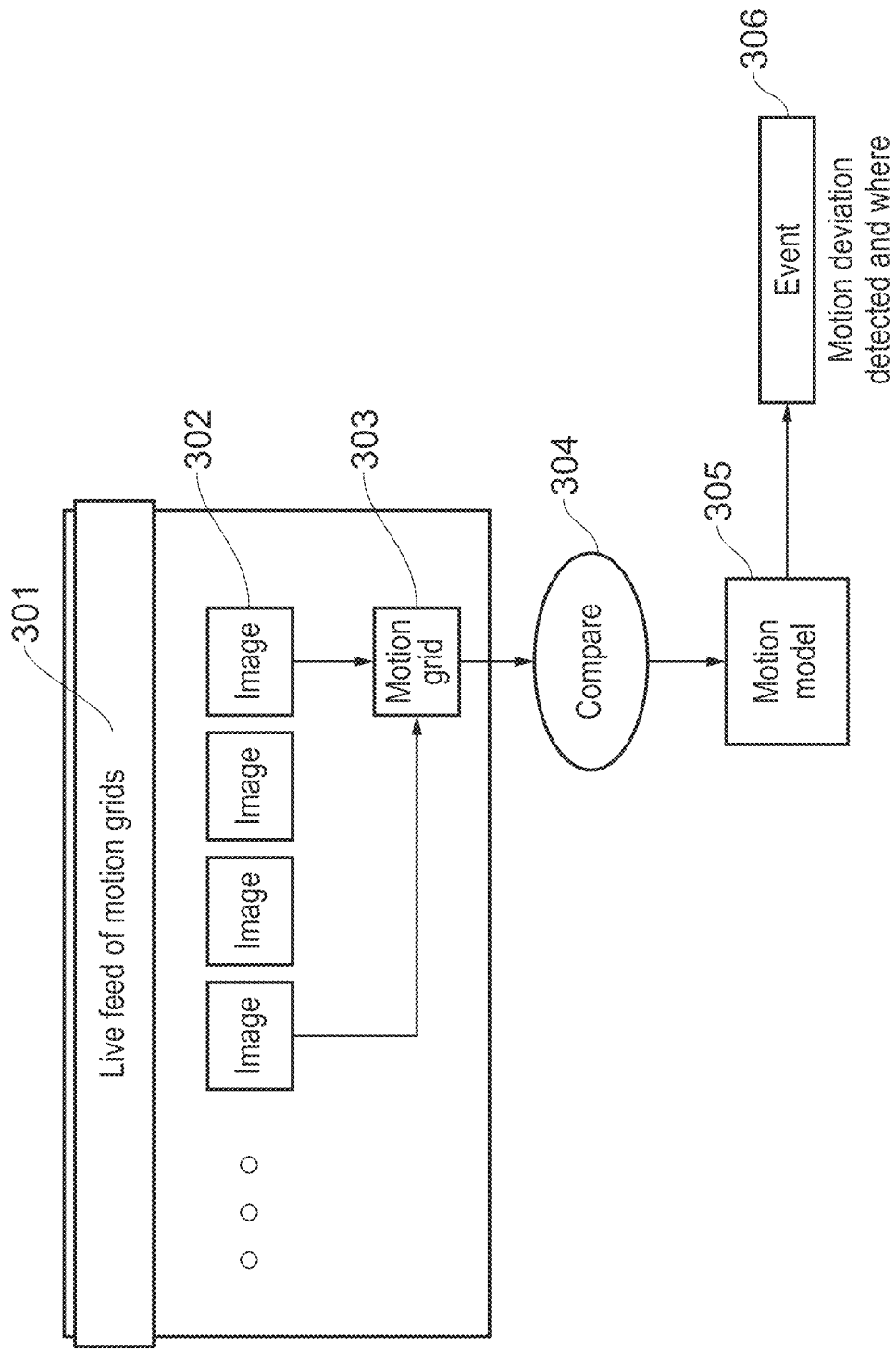
FIG. 3 is a diagram illustrating a method of detecting motion deviation in a video and triggering an event if deviation is detected.

FIG. 3 illustrates a method for detecting motion deviation in a video scene according to some embodiments. First, a current motion grid 303 is generated from a live video feed 301 comprising a sequence of images 302 as described above. The video may also be a pre-recorded video instead of a live video. The temporal location of the current motion grid 303 is after the time interval of the motion model 305. The motion model 305 is generated using the method described earlier. The current motion grid 303 obtained from the live feed 301 and the motion model 305 relate to the same scene of the video, for example, to the same target, e.g. a room that is being monitored at a specific time of the day, or a part of a highway where traffic situation is observed.

Next, the current motion grid 303 obtained from a specific scene in the video is compared 304 to the motion model 305 which is generated based on history data of the specific scene in the video. The comparison 304 may include comparing indications stored in elements in a region of the current motion grid 303 to indications stored in corresponding elements in the corresponding region of the motion model 305. Alternatively, the indications in the elements in the region of the current motion grid 303 can be compared to a predetermined value. The region may comprise any number of grid elements.

If, based on the comparison, the indication stored in an element in the selected region of the current motion grid 303 differs from the indication stored in the corresponding element in the corresponding region of the motion model 305 or from the predetermined value, it is determined that there is motion deviation, an unexpected object or abnormal motion in the video.

It is noted that it is not necessary to use the complete area of the past motion grids to build the motion model 305, but it is also possible to extract a region of the motion grids and use that instead. Similarly, it is not necessary to use the whole area of the frames of the images 302, but only a specific region of the images can be selected. The motion model 305 and the current motion grid 303 can be compared with each other as long as they cover the same area and have the same dimensions.

As a result of determining that there is motion deviation, an event 306 may be triggered. In some embodiments, triggering the event 306 may take into account a predetermined threshold so that the event is triggered only if the number of deviating elements in a region exceeds the threshold.

The triggering of the event 306 may comprise at least one of setting a flag, setting a value of a bit, raising an alert and outputting a notification. The notification may be sent to a user to notify him that motion deviation is detected. Triggering the event 306 may also comprise outputting information of the location and/or number and/or identification information elements on the current motion grid 303, in which potentially abnormal motion is detected. Hence the trigger can be used to inform the user, where the motion deviation has been detected. In addition, the moment at which the deviation occurs in the video may be output. The output information may include also other information about the deviation. The deviation information may be stored in a memory or database for later analysis.

Figure 4:
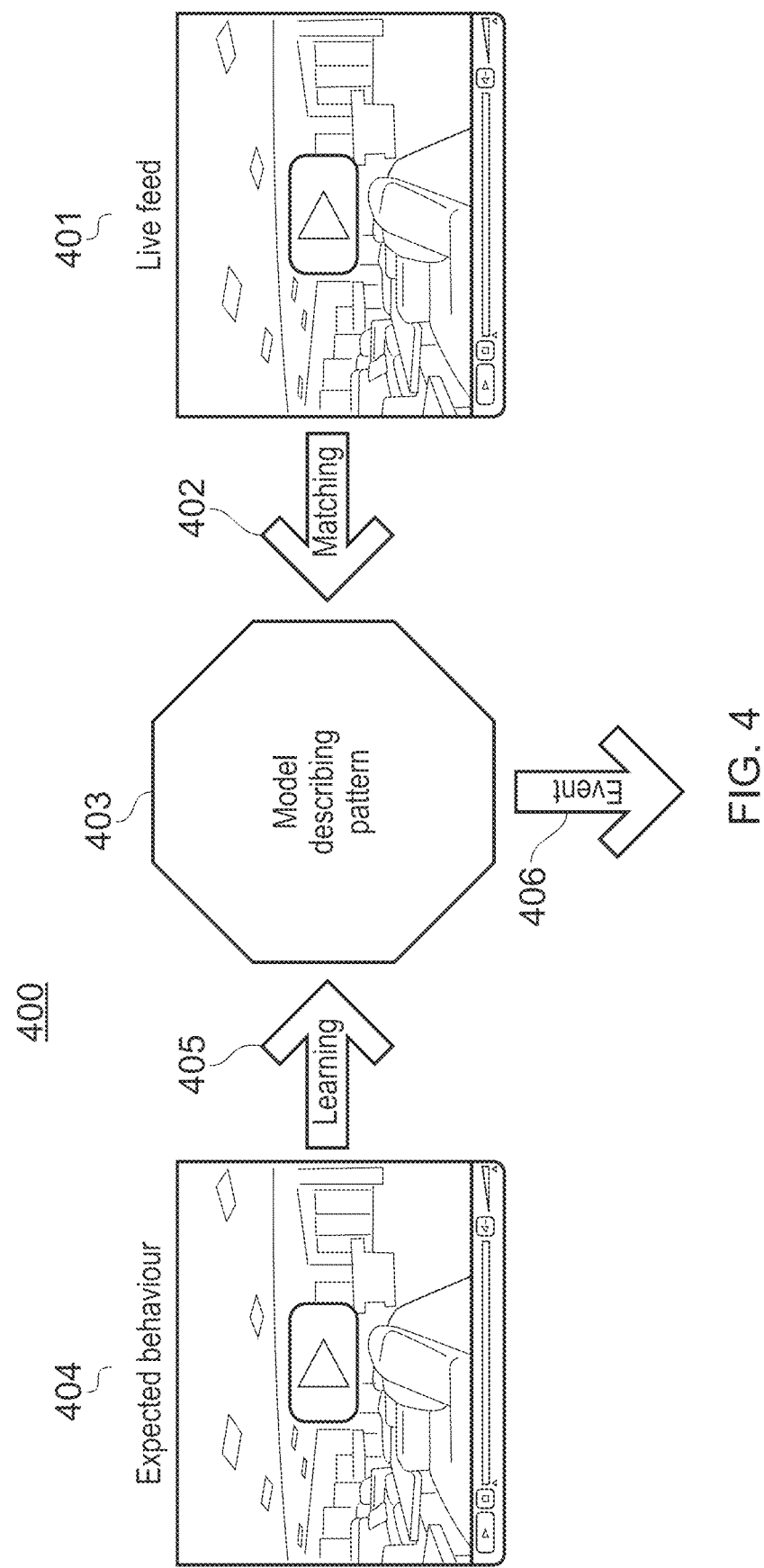
FIG. 4 is a diagram illustrating a method of updating the motion model.

FIG. 4 shows a flowchart of a method 400 for updating a motion model 403 according to what is considered as expected motion behaviour 404. In the method 400, live video feed 401 is matched 402 to the motion model 403. This may include comparison of a current motion grid to the motion model as described above. In a normal case, if the current motion grid obtained from the live video feed differs from the expected motion behaviour 404, it may trigger an event 406. Depending on the triggered event, it may cause for example sending an automatic notification to a user or outputting an alarm by the system.

In some cases, however, the motion model 403 may be updated to include also the motion grids in which deviation from the expected motion behaviour occurs. This way, such deviations will not trigger an event in future. The decision of which deviations are included in the motion model 403 as expected behaviour 404 may be made by a user for example after noticing that a false alarm has been triggered. The motion model can "learn" 405 from the made decisions and include similar deviations in future automatically in the pattern of expected motion behaviour.

Figure 5A:
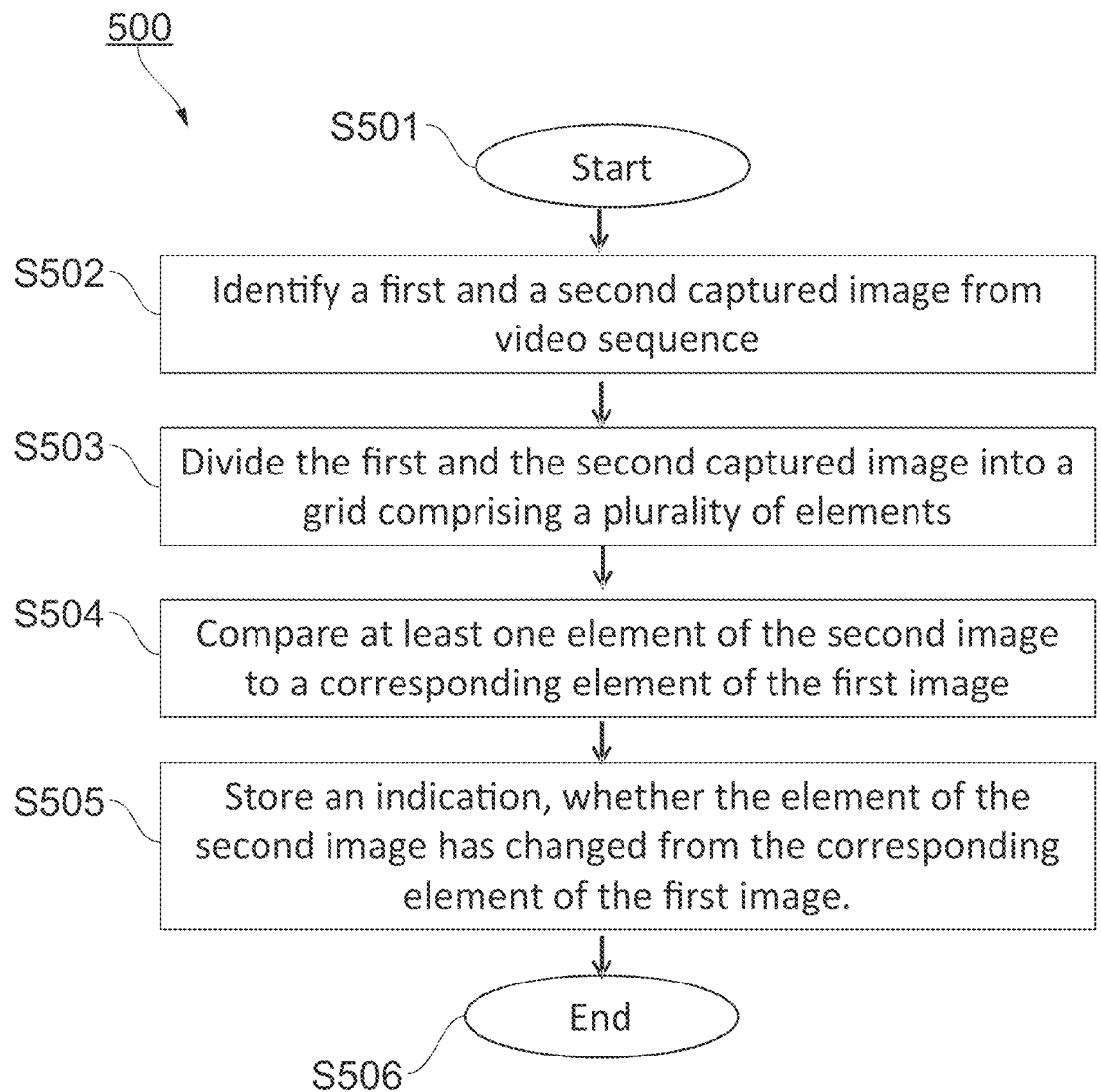
FIG. 5A is a flowchart illustrating a method for generating a motion grid.

With reference to the flowchart in FIG. 5A, a method 500 for generating a motion grid 130, 140 is described. The method starts at step S501. At step S502, a first and a second captured image are identified from a video sequence. It is to be noted that the terms "first" and "second" are used for clarity purposes only. There is no limitation of any kind with respect to the temporal location of the two images in the video sequence. The video sequence can be in various video formats.

At step S503, the first and the second captured image are divided into a grid comprising a plurality of elements. Then, at step S504, at least one element of the second image is compared to a corresponding element of the first image. At step S505, an indication is stored in an element of the motion grid, whether the at least one element of the second image has changed from the corresponding element of the first image. The method ends at step S506.

Figure 5B:
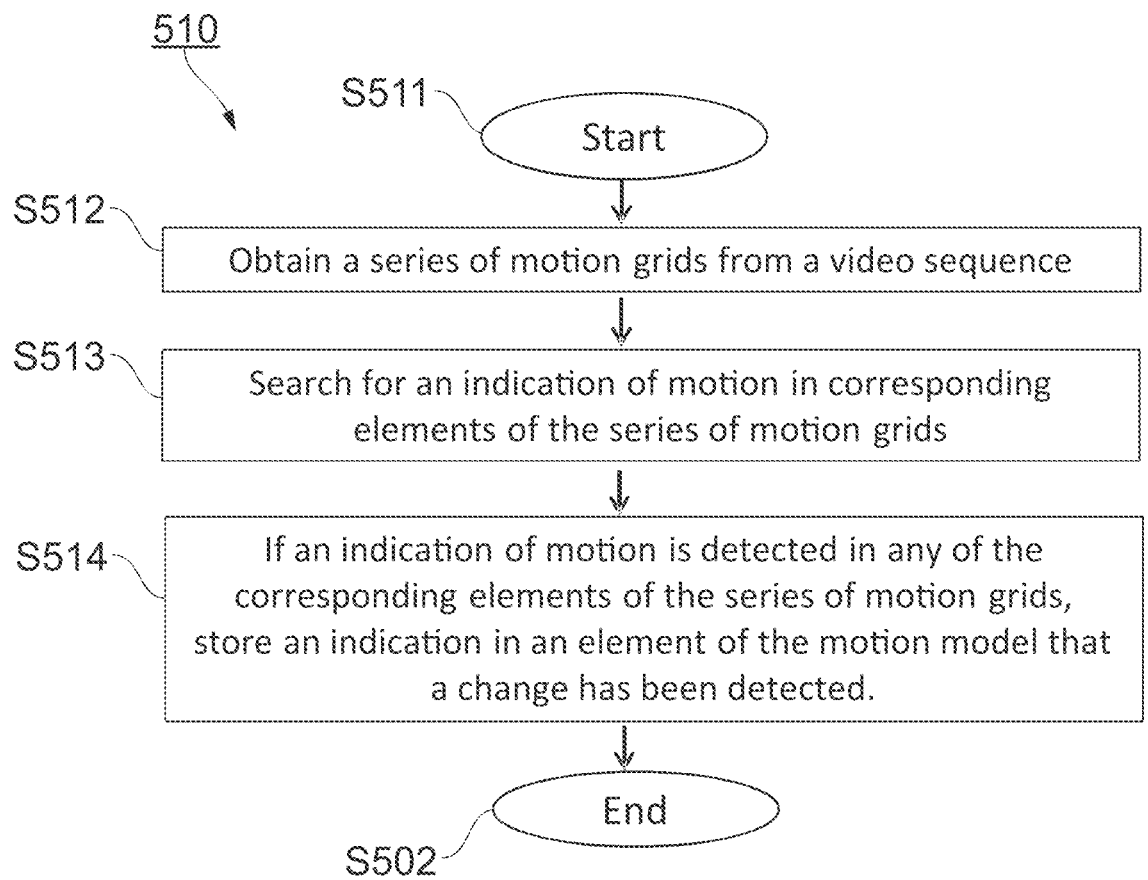
FIG. 5B is a flowchart illustrating a method for generating a motion model.

Referring to the flowchart of FIG. 5B, a method 510 for generating a motion model is described. The method starts at step S511. First, at step S512, a series of motion grids is obtained from a video sequence to be modelled. At step S513, all corresponding elements of the series of motion grids are searched for an indication of motion. If an indication of motion is detected in any of the corresponding elements of the series of motion grids, an 'true' indication is stored in the corresponding element of the motion model (S514). The method ends at step S515.

Figure 5C:
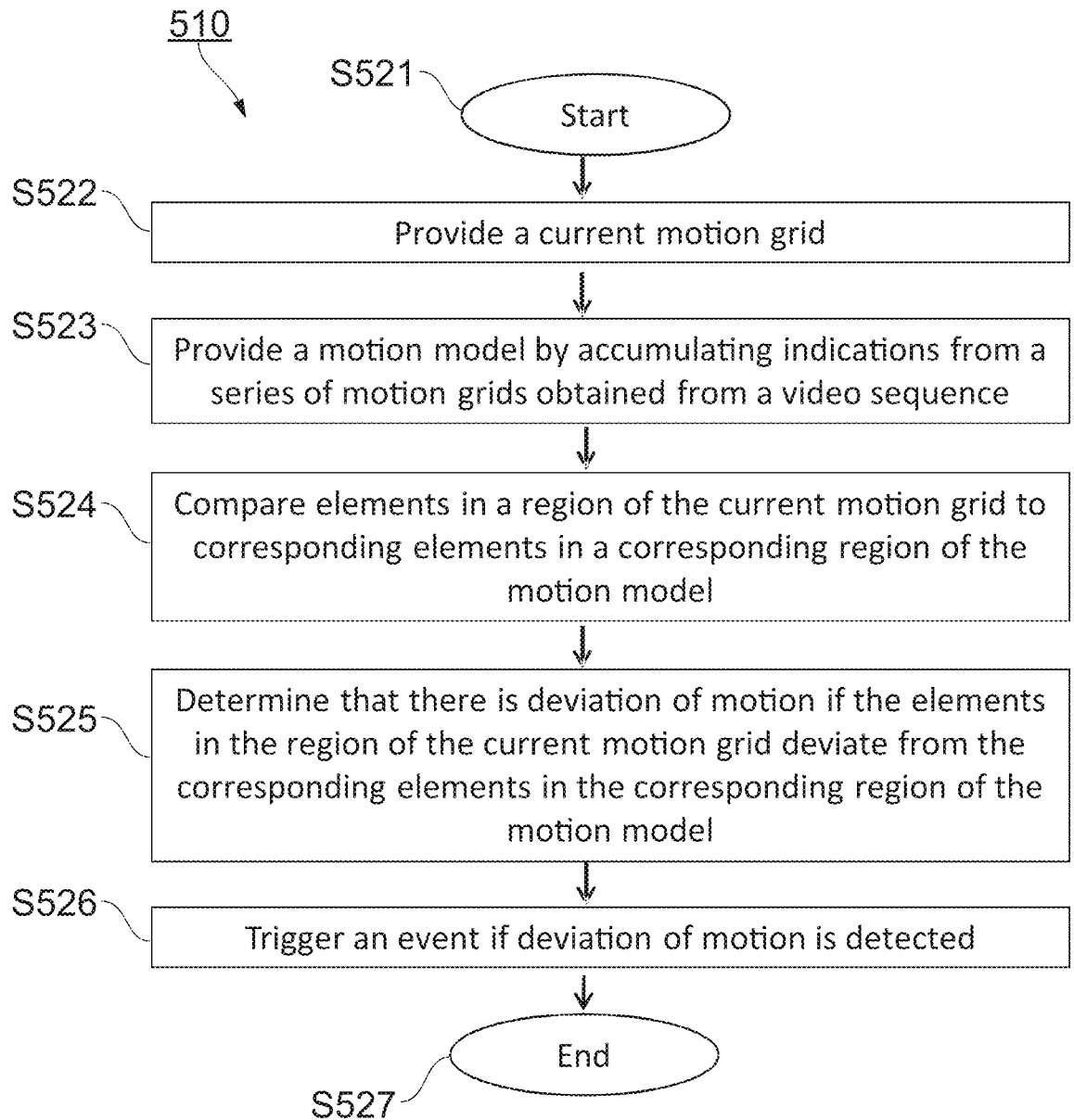
FIG. 5C is a flowchart illustrating a method for detecting motion deviation in a video.

FIG. 5C illustrates a method flowchart for detecting motion deviation in a video scene according to some embodiments of the present invention. The method starts at step S521. First, at step S522, a current motion grid is provided. The current motion grid can be generated by comparing two images to each other which are captured from a live video feed comprising a sequence of images, as described above with reference to FIG. 5A. Alternatively, the motion grid can be pre-stored in a memory, e.g. together with the video data. The current motion grid includes a plurality of elements. In each element of the current motion grid, an indication is stored of whether there is a change between the corresponding elements of the two captured images of the video sequence.

Next, at step S523, a motion model is provided. The motion model may be a grid-form presentation of expected motion behaviour based on history data obtained from a video sequence of the scene. The motion model has been generated by accumulating information from a series of motion grids obtained from the video sequence, as described above. In some embodiments, the motion model is not based on actual history data but is generated by storing a predetermined value or indication in each element of the model.

At the next step S524, the current motion grid is compared to the motion model. The comparison may include comparing an element in a selected region of the current motion grid to a corresponding element in the region of the motion model. The comparison step S524 may be repeated with the other elements of the current motion grid. At S525, it is determined, based on the comparison, whether there is motion deviation. The determination may include determining whether the element in the region of the current motion grid deviates from the corresponding element in the corresponding region of the motion model. If the information stored in the elements differ from each other, it may be determined that there is motion deviation.

As a result of detecting motion deviation, an event can be triggered (S526). Whether the event is triggered or not may depend on whether the deviation fulfils certain criteria, for example whether it exceeds a certain threshold. For instance, a certain level of noise can be taken into account to reduce unnecessary alerts. The method ends at step S527.

The above described processing may be implemented in various hardware depending on the situation. Various hardware that can detect motion deviation will now be described.

Figure 6:
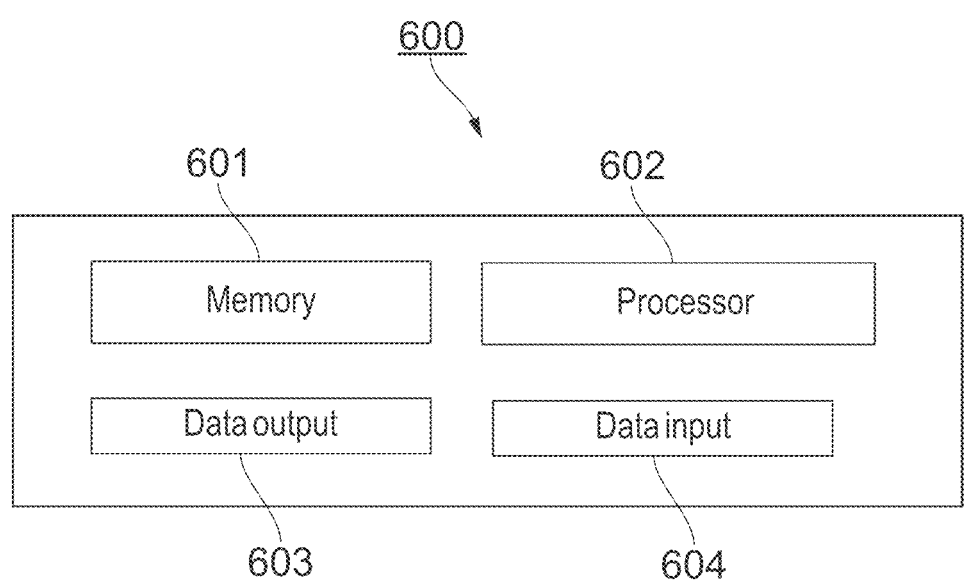
FIG. 6 is a simplified block diagram illustrating an apparatus according to some embodiments of the present invention.

FIG. 6 is a simplified block diagram illustrating a first apparatus 600 embodying the present invention. The apparatus 600 includes at least one processor 602 configured to process video sequences and motion grid data according to the methods of the present invention. The apparatus 600 further includes at least one memory 601 configured to store video, motion grid and motion model data and computer program code for one or more programs (not shown).

The processor 602 is configured, with the computer program and memory 601, to generate a current motion grid. The processor 602 is further configured to generate a motion model from the video sequence by accumulating indications from a series of motion grids obtained from the video sequence, as previously described. The processor 602 is also configured to process pre-stored motion grids and motion models.

The processor 602 is further configured to perform comparison between the current motion grid and the motion model and to determine, based on the result of the comparison, whether or not there is motion deviation, according to the previously described methods. The processor 602 is further configured to compare the element of the current motion grid to a predetermined value, according to the previously described methods. The computer programs executed by the processor 602 and memory 601 may perform the previously described video sequence processing. Thus, the apparatus 600 is configured to detect motion deviation by executing the methods of the present invention.

The apparatus 600 may further comprise a data input 604 configured to receive data, such as video data, and a data output 603 configured to output data, such as a notification that motion deviation is detected. The data input 604 and data output 603 are configured to receive and send data to communicate with external devices. The apparatus 600 may also comprise a unit for wireless receiving and transmitting of data and for connecting the apparatus to a network such as WLAN, LTE or 5G network. Moreover, it may include an external memory unit, a sensor for detecting light and/or motion, a database for storing information, and one or more drivers. The apparatus may be a video camera. Alternatively, the apparatus may be a client terminal, server or a personal computer.

Figure 7:
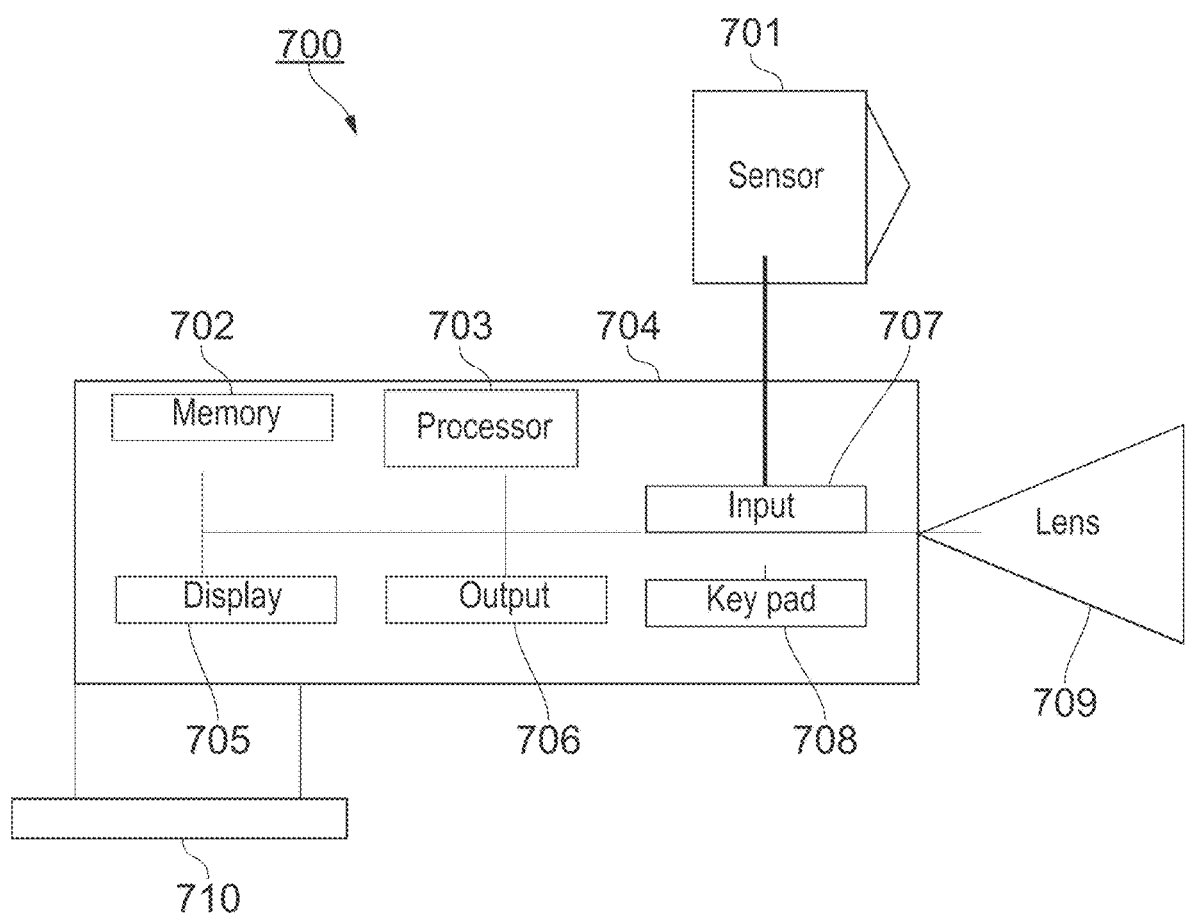
FIG. 7 is a simplified block diagram illustrating a video camera for implementing the method according to some embodiments of the present invention.

FIG. 7 is a simplified block diagram of a video camera 700 configured to perform the methods of the present invention.

According to some embodiments, the video camera 700 includes a lens 709 which is configured to capture a video and connected to at least one processor 703 and memory 702. The processor 703 is configured to process video sequences and motion grid data according to the methods of the present invention. The memory 702 is configured to store video, motion grid and motion model data and computer program code for one or more programs. The processor 703 is configured to process the video captured by the lens 709 and to generate a motion grid and a motion model based on the video sequence. The memory 702 is configured to store the recorded video sequence and generated motion grid data. The computer programs executed by the processor 703 and memory 702 may perform the previously described video sequence processing.

Additionally, the video camera 700 may comprise a housing 704, a data output 706 for outputting data such as a notification that motion deviation is detected, a data input 707 for receiving data such as video data, and a key pad or a user interface 708. Optionally, the video camera 700 includes a sensor 701 for detecting light or movement and a display 705. It may further include a support element or fixing element 710 for installing the video camera to remain in a static position.

Figure 8:
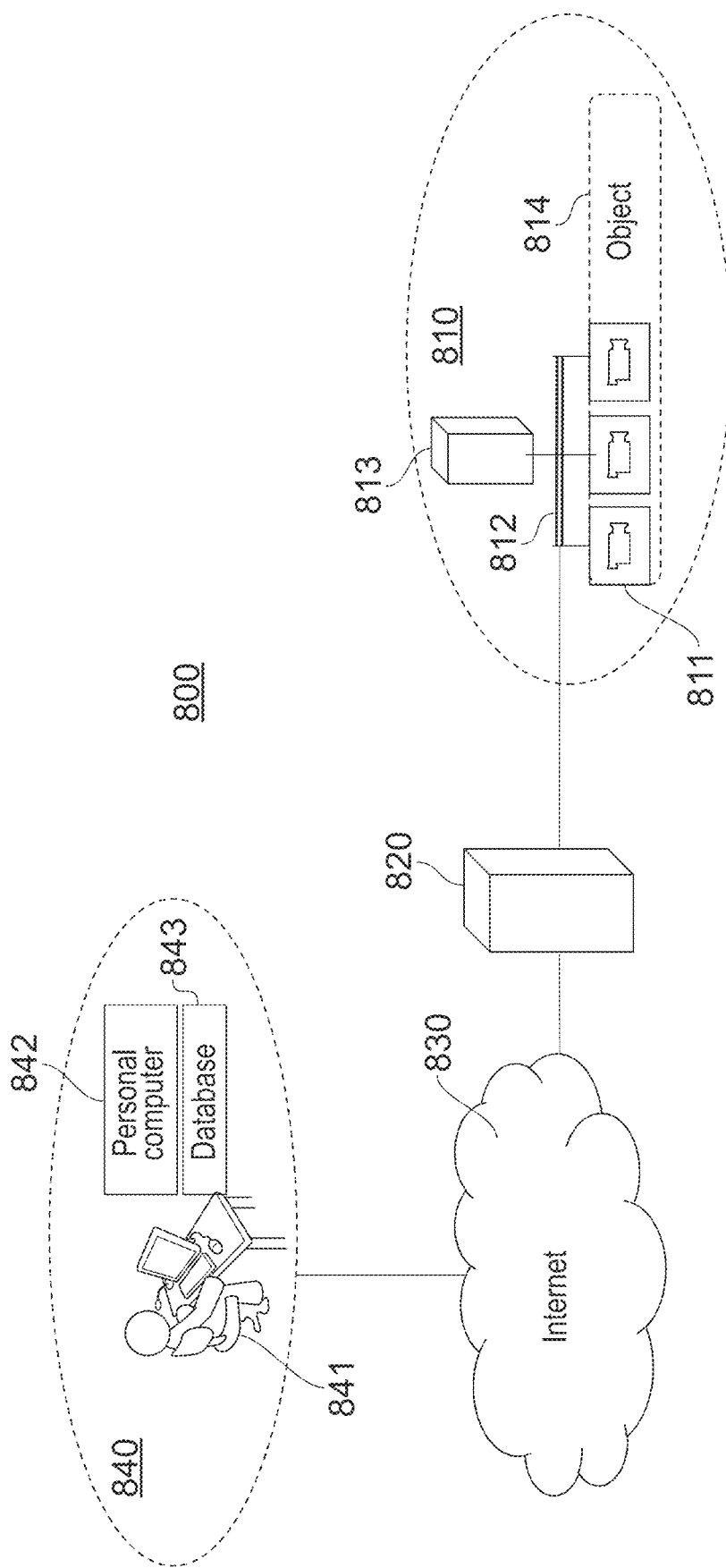
FIG. 8 is a simplified block diagram illustrating a system according to some embodiments of the present invention.

FIG. 8 is a simplified block diagram illustrating a system 800 according to some embodiments of the present invention. The system 800 includes an apparatus according to the present invention connected logically to other entities in the system as described below. The apparatus may be implemented in various entities of the system.

According to one embodiment of the present invention, the apparatus may be a video surveillance camera 811 installed at a remote site 810. The video surveillance camera 811 captures a video sequence of a scene, which is either processed by the video camera 811 or sent via a network or bus 812 to a server or computer 813, 820, 842 for processing. The video camera 811 may be connected to other video cameras via the bus 812, for example to provide full coverage of the monitored object 814. The video camera 811 may be additionally connected to one or more local computers 813 which comprise at least a processor and a memory (not shown) for processing and storing video data.

The video surveillance camera 811 is used for recording a video sequence to generate a motion grid and a motion model as previously described. The video surveillance camera may include all equipment, software and resources for analysing the video sequence and executing the methods of the present invention. The remote site 810 may be for example an industry site, a living property, rural area or a shop. The remote site may be connected to a management site 840 via a network 830.

According to another embodiment, the apparatus of the present invention may be implemented separately from the surveillance camera installation. For example, the apparatus may include or be integrated in a separate server 820, a cloud based server or a computer located at a management site 840. The apparatus is configured to execute the methods according to the present invention.

The management site 840 may comprise personal computers 842 configured to operate the surveillance camera installation and a database 843 configured to store motion grid and video data. The personal computers 842 or servers at the management site may have greater processing capabilities and resources than what is available at the remote site 810. A person 841 using the personal computer 842 may receive a notification that motion deviation has been detected and may react to it accordingly. The user may for example determine that the motion deviation belongs to normal motion behaviour and decide to include the deviation in the motion model.

According to an embodiment, motion grid data may be sent to the network 830 to be processed externally of the surveillance camera installation. The data may be processed for example at the management site 840 including one or more personal computers configured to operate the surveillance camera installation. The servers or personal computers may be configured to execute the methods according to the present invention.

Figure 9A:
FIG. 9A is a graphical representation of an image captured from a video.

FIG. 9A is a graphical representation of a captured image showing a part of a highway where traffic is observed. The image may be obtained from a video sequence recorded by a video camera and is an example of the captured image used for generating the motion grid and the motion model.

Figure 9B:
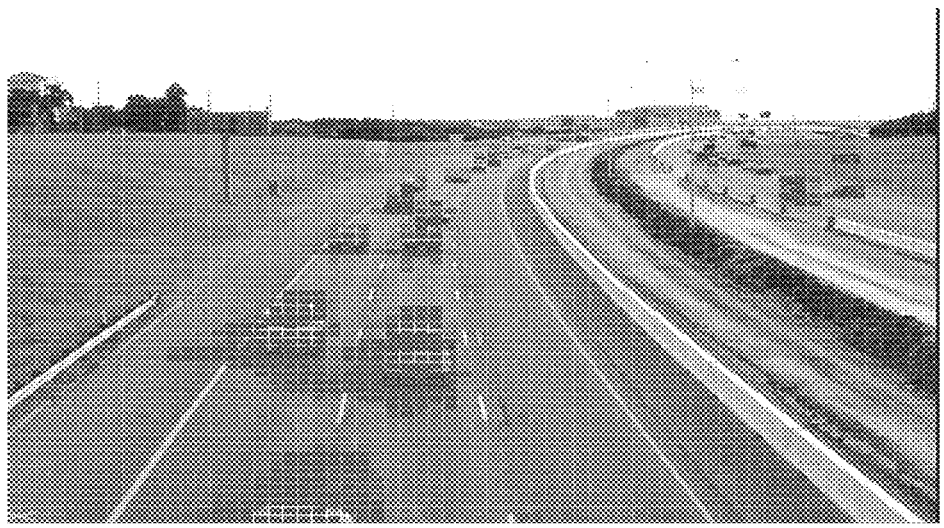
FIG. 9B is a graphical representation of the motion grid as an overlay on the captured image.

FIG. 9B is a graphical representation of a motion grid as an overlay on the captured image of FIG. 9A. The image has been divided into a grid of elements. The elements in which a change has been detected between two captured images of the video sequence are shown as highlighted on the motion grid.

Figure 9C:
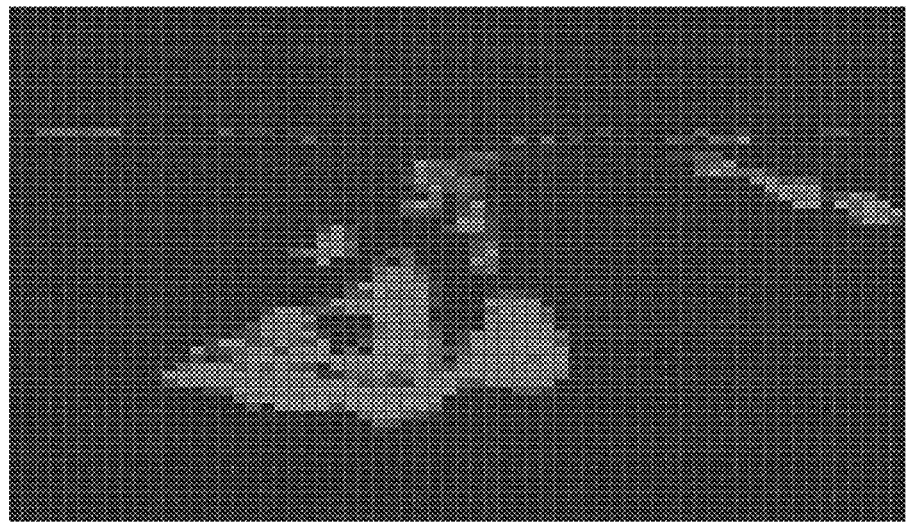
FIG. 9C is a graphical representation of the motion grid metadata only.

FIG. 9C is a graphical representation of the motion grid based on the captured image of FIG. 9A. As shown in FIG. 9C, only the elements in which a change has been detected are visible. The highlighted elements correspond to motion grid elements with a 'true' or '1' indication as described previously in connection with FIG. 1A and FIG. 1B.

Figure 9D:
FIG. 9D is a graphical representation of a pattern showing accumulated motion grid data.

FIG. 9D is a graphical representation of a pattern showing accumulated motion data, corresponding to the motion model according to the present invention. All elements of the motion model in which change has occurred in the past are highlighted. The highlighted area represents also the area in which motion is expected. If motion is detected in the area which is not highlighted, that would be interpreted as abnormal or unusual motion which may cause triggering an alarm.

The present invention can be used especially for, but is not limited to, surveillance systems such as city surveillance, mobile surveillance systems, transportation installations, and from small or medium-sized installations to high-security installations. The use of the present invention is not limited to video surveillance but it can be used also for other imaging applications.

The above examples can be realised by a computer, a central processing unit (CPU) or a micro processing unit (MPU) of a system or apparatus that reads out and executes a program recorded on a memory device to perform the functions of the above-described embodiments. The above examples can also be realised by a method, the steps of which are performed by the computer of the system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable storage medium such as a non-transitory computer-readable storage medium).

The computer may comprise one or more of a central processing unit, micro processing unit, or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The present invention can be implemented in various forms without departing from the principal features of the present invention.

What is claimed is:

1. A method for detecting motion deviation in a video, comprising:
   generating a motion grid comprising a plurality of elements by storing in each element of the motion grid an indication of whether there is a change between corresponding elements of at least two images of the video, wherein the indication is determined based on whether a number of changed pixels between the corresponding elements exceeds a predetermined threshold;
   providing a motion model including a plurality of elements, wherein the motion model is generated by accumulating information from motion grids each of which is generated in the generating;
   comparing at least one element of a current motion grid, generated in the generating, to a corresponding element of the motion model; and
   determining whether there is motion deviation in accordance with the result of the comparison.

2. The method of claim 1, comprising triggering an event when it is determined that there is motion deviation.

3. The method of claim 2, comprising triggering the event only when the number of deviating elements exceeds a predetermined threshold.

4. The method of claim 2, wherein the triggering the event comprises at least one of setting a flag, setting a value of a bit, raising an alarm, and outputting a notification.

5. The method of claim 2, wherein the triggering of the event causes notifying a user that motion deviation is detected.

6. The method of claim 1, further comprising outputting information identifying the deviating element on the current motion grid.

7. The method of claim 1, further comprising updating the motion model by including the deviating element in the motion model when instructed to do so by a user.

8. The method of claim 1, further comprising incrementally updating the motion model by adding further motion grids related to the video.

9. The method of claim 1, wherein each of the captured images is divided into a grid comprising a plurality of elements, the grids having the same dimensions as the current motion grid.

10. The method of claim 1, wherein the indication is 'true' ('1') or 'false' ('0').

11. The method of claim 10, wherein the indication is marked as 'true' only when the number of changed pixels in the element exceeds a predetermined threshold.

12. The method of claim 1, wherein the initial value of the indication in each element is 'false' ('0').

13. The method of claim 1, wherein the current motion grid is obtained from a live video recorded by a video camera.

14. The method of claim 1, wherein the motion model is generated by obtaining a series of motion grids from the video and storing an indication in each element of the motion model on whether a change is indicated in any of the corresponding elements of the series of motion grids.

15. The method of claim 14, wherein the series of motion grids is obtained from motion grid metadata generated in advance and stored in a database.

16. The method of claim 1, wherein the images used for generating the motion model appear earlier in the video than the images used for generating the current motion grid.

17. The method of claim 1, wherein the motion model has the same dimensions as the current motion grid.

18. The method of claim 1, wherein the motion model is obtained from a certain time interval of the video sequence.

19. The method of claim 18, wherein the time interval is defined by a time of the day and/or day of the week.

20. The method of claim 1, wherein the corresponding elements have the same location on each grid defined by a row and a column.

21. The method of claim 1, wherein the video comprises a surveillance video.

22. An apparatus for detecting motion deviation in a video, comprising:
   at least one processor; and
   at least one memory including computer program code configured to, when executed by the at least one processor, cause the apparatus to
   perform a generating process for generating a motion grid comprising a plurality of elements by storing in each element of the motion grid an indication of whether there is a change between corresponding elements of at least two images of the video, wherein the indication is determined based on whether a number of changed pixels between the corresponding elements exceeds a predetermined threshold;
   provide a motion model including a plurality of elements, wherein the motion model is generated by accumulating information from motion grids each of which is generated in the generating process;
   compare at least one element of a current motion grid, generated in the generating process, to a corresponding element of the motion model; and
   determine whether there is motion deviation in accordance with the result of the comparison.

23. A non-transitory computer readable storage medium tangibly encoded with a computer program executable by a processor to perform actions comprising a method for detecting motion deviation in a video, the method comprising:
   generating a motion grid comprising a plurality of elements by storing in each element of the motion grid an indication of whether there is a change between corresponding elements of at least two images of the video, wherein the indication is determined based on whether a number of changed pixels between the corresponding elements exceeds a predetermined threshold;
   providing a motion model including a plurality of elements, wherein the motion model is generated by accumulating information from motion grids each of which is generated in the generating;
   comparing at least one element of the current motion grid to a corresponding element of the motion model; and
   determining whether there is motion deviation in accordance with the result of the comparison.

* * * * *